US012645515B2

(12) United States Patent　　(10) Patent No.:　US 12,645,515 B2
Jain et al.　　(45) Date of Patent:　Jun. 2, 2026

(54) SYSTEM AND METHOD TO IMPLEMENT A FAILSAFE MIDDLEWARE STARTING PROCEDURE FRAMEWORK

(71) Applicant: Bank of America Corporation, Charlotte, NC (US)

(72) Inventors: Rakesh Jain, Murphy, TX (US); John David Weber, St. Louis, MO (US)

(73) Assignee: Bank of America Corporation, Charlotte, NC (US)

( * ) Notice: Subject to any disclaimer, the term of this patent is extended or adjusted under 35 U.S.C. 154(b) by 502 days.

(21) Appl. No.: 18/355,084

(22) Filed: Jul. 19, 2023

(65) Prior Publication Data

US 2025/0028582 A1　　Jan. 23, 2025

(51) Int. Cl.
G06F 9/54　　(2006.01)

(52) U.S. Cl.
CPC ........ G06F 9/546 (2013.01); G06F 2209/547 (2013.01)

(58) Field of Classification Search
None
See application file for complete search history.

(56) References Cited

U.S. PATENT DOCUMENTS

| | | | |
|---|---|---|---|
| 7,590,653 B2 | 9/2009 | Sparks | |
| 7,912,896 B2 | 3/2011 | Wolovitz et al. | |
| 8,402,061 B1 | 3/2013 | Briggs et al. | |
| 8,849,793 B2 | 9/2014 | Vexler | |

| | | | |
|---|---|---|---|
| 9,251,199 B2 | 2/2016 | Schiebeler | |
| 9,354,778 B2 | 5/2016 | Cornaby et al. | |
| 9,589,148 B2 | 3/2017 | O'Hare et al. | |
| 9,594,586 B2 | 3/2017 | Shigeta | |
| 9,632,814 B2 | 4/2017 | Bonilla et al. | |
| 9,654,937 B2 | 5/2017 | Addepalli et al. | |

(Continued)

FOREIGN PATENT DOCUMENTS

| | | | | | |
|---|---|---|---|---|---|
| CN | 106339240 A | * | 1/2017 | ............... | G06F 8/60 |
| CN | 106487600 A | * | 3/2017 | ......... | H04L 41/0886 |

(Continued)

OTHER PUBLICATIONS

Jain, Rakesh, System and method to automate discovery of middleware instances during installation of a failsafe middleware starting procedure framework, U.S. Appl. No. 18/355,065, filed Jul. 19, 2023.

*Primary Examiner* — Charles E Anya

(57)　　ABSTRACT

An apparatus may comprise a memory communicatively coupled to a processor. The memory may be configured to store a start script configured to enable execution of one or more middleware instances and multiple start-up files configured to indicate any middleware instances to be executed by an admin server or one or more managed servers. The processor may be configured to trigger initiation of the start script, determine whether the start-up files comprise a middleware instance, ping the admin server in response to determining that the start-up files comprise the middleware instance, and determine that the admin server is running. Further, the processor is configured to ping the managed server associated with databases associated with a managed server, determine that the databases are running, and trigger a start of the middleware instance at the admin server or at the managed server.

20 Claims, 5 Drawing Sheets

(56) References Cited

U.S. PATENT DOCUMENTS

| | | | |
|---|---|---|---|
| 10,015,437 B2 | 7/2018 | Fall et al. | |
| 10,249,014 B2 | 4/2019 | Bala et al. | |
| 10,503,493 B2 | 12/2019 | Narayanan et al. | |
| 10,579,426 B2 | 3/2020 | Kang | |
| 10,872,333 B2 | 12/2020 | Dua | |
| 11,038,986 B1 * | 6/2021 | Acar | H04L 67/34 |
| 11,552,996 B2 | 1/2023 | Lang et al. | |
| 2005/0192962 A1 | 9/2005 | Furrer et al. | |
| 2008/0256118 A1 | 10/2008 | Ziegler et al. | |
| 2009/0182707 A1 | 7/2009 | Kinyon et al. | |
| 2011/0196959 A1 * | 8/2011 | Devarakonda | H04L 67/51 |
| | | | 709/224 |
| 2013/0227547 A1 * | 8/2013 | Little | G06F 8/31 |
| | | | 717/177 |
| 2013/0247136 A1 * | 9/2013 | Chieu | G06F 21/577 |
| | | | 726/1 |
| 2015/0229521 A1 * | 8/2015 | Mayer | H04L 41/0806 |
| | | | 709/222 |
| 2022/0122002 A1 | 4/2022 | Kamen et al. | |
| 2024/0345871 A1 * | 10/2024 | Dees | G06F 9/485 |

FOREIGN PATENT DOCUMENTS

| | | | | | |
|---|---|---|---|---|---|
| CN | 108563455 A | * | 9/2018 | | G06F 9/54 |
| CN | 109189551 A | * | 1/2019 | | G06F 9/54 |
| CN | 106059841 B | * | 8/2019 | | H04L 41/0803 |
| CN | 113886014 A | * | 1/2022 | | G06F 21/602 |
| CN | 117170967 A | * | 12/2023 | | Y02D 10/00 |

* cited by examiner

System 100

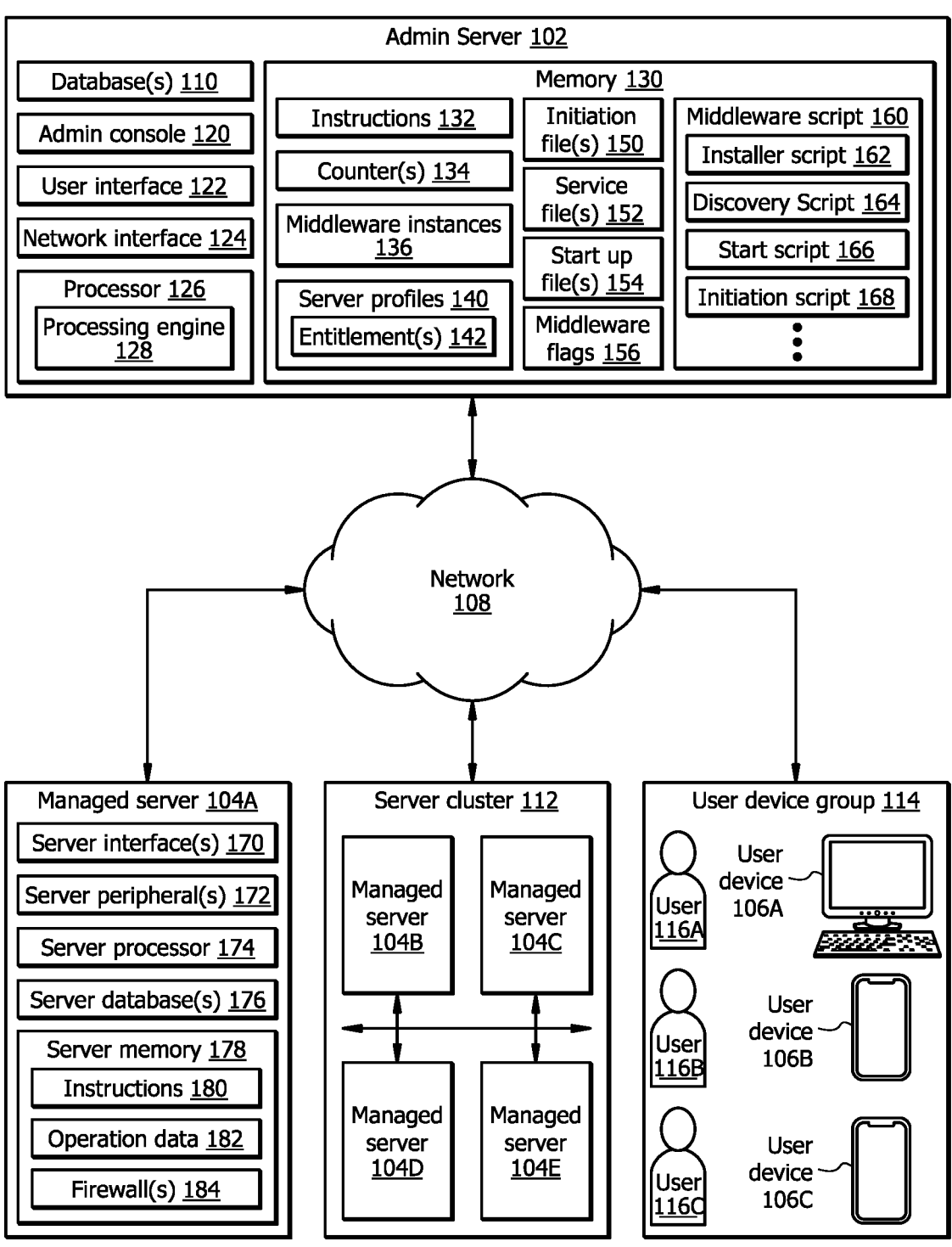

Admin Server 102

Database(s) 110

Admin console 120

User interface 122

Network interface 124

Processor 126
Processing engine 128

Memory 130

Instructions 132

Counter(s) 134

Middleware instances 136

Server profiles 140
Entitlement(s) 142

Initiation file(s) 150

Service file(s) 152

Start up file(s) 154

Middleware flags 156

Middleware script 160

Installer script 162

Discovery Script 164

Start script 166

Initiation script 168

Network 108

Managed server 104A

Server interface(s) 170

Server peripheral(s) 172

Server processor 174

Server database(s) 176

Server memory 178

Instructions 180

Operation data 182

Firewall(s) 184

Server cluster 112

Managed server 104B

Managed server 104C

Managed server 104D

Managed server 104E

User device group 114

User 116A — User device 106A

User 116B — User device 106B

User 116C — User device 106C

*FIG. 1*

Process 200

Process 300

Process 300

Process 300

SYSTEM AND METHOD TO IMPLEMENT A FAILSAFE MIDDLEWARE STARTING PROCEDURE FRAMEWORK

TECHNICAL FIELD

The present disclosure relates generally to operation of a system configured to enable execution of middleware instances, and more specifically to a system and method to implement a failsafe middleware starting procedure framework.

BACKGROUND

Middleware operations comprise communication and data management between operating systems and distributed applications running on operating systems. The distributed applications may require processing resources and memory resources to start. In some cases, middleware operations cannot be performed because a given application is not identified as part of a start-up process of a server executing the middleware operations. In other cases, middleware operations cannot be performed because the memory resources and the memory resources are not available during initiation of a given application. In these cases, the given application may be considered to be unreachable.

SUMMARY OF THE DISCLOSURE

In one or more embodiments, a system and the method enable reduce, prevent, or eliminate connectivity failures while a server gathers processing resources and memory resources to initiate a middleware instance. Middleware instances (e.g., middleware operations) comprise communication and data management between operating systems and distributed applications running on the operating systems. The middleware instances may be attempts to initiate implementation of the distributed applications. In some embodiments, the system and the method enable middleware instances to be performed by ensuring that a given application is identified as part of a start-up process of a server executing the middleware instances. In other embodiments, the system and the method enable middleware instances to be performed by ensuring that the processing resources and the memory resources are available during initiation of a given application. In this regard, the system and the method prevent the given application from being considered to be unreachable.

Automate Discovery of Middleware Instances During Installation of a Failsafe Middleware Starting Procedure Framework In one or more embodiments, a system and a method are configured to automate discovery of middleware instances during installation of a failsafe middleware starting procedure framework. In particular, the system and the method are configured to automatically discover installed middleware instances as a middleware starting procedure framework is installed in an administration (admin) server. The system and the method are configured to generate operational parameters to check for installed instances currently configured in the admin server. In this regard, the method and the system reduce, prevent, or eliminate failures while enabling starting procedures for middleware instances. In particular, the system and the method trigger initiation of an installer script a first time a server is being programmed with the middleware starting procedure framework. The admin server may identify whether any installed instances are associated with active middleware instances in the admin server. Further, the system and the method may check for existing configuration of the admin server and products currently associated with the admin server. The admin server may generate multiple start-up files based at least in part upon results evaluating whether the admin server already comprises existing configuration to perform the middleware starting procedures and any middleware products associated to the middleware starting procedures in the network.

In one or more embodiments, the system and the method described herein are integrated into a practical application of reducing, preventing, or eliminating negative impacts of missing middleware instances during start-up operations. For example, the system and the method automatically determine any installed middleware instances in an admin server and determine which of these instances are considered to be active in an event that the admin server is installing a starting framework. As a result, the system and the method may generate start-up files comprising middleware instances that are confirmed to be part of ongoing operations of the admin server. The results may then be compiled in multiple start-up files that account for all active middleware instances to initiate during the starting procedure. In some embodiments, significant human resources, processing resources, and memory resources may be saved when instances of the admin server are automatically determined as the starting procedure is installed and start-up files are generated. In some embodiments, the system and the method prevent the admin server from going into a hung state or from being unresponsive.

In one or more embodiments, the system and method are directed to improvements in computer systems. Specifically, the system and the method reduce processor and memory usage in the admin server by automating identification of installed middleware instances and determination of which installed middleware instances are activate. Further, the system and the method are configured to reduce the possibility of middleware instances being considered unreachable as active middleware instances are accounted for as the starting procedure is installed.

In one or more embodiments, the system and the method may be performed by an apparatus, such as the server. Further, the system may comprise the apparatus. In addition, the system and the method may be performed as part of a process performed by the apparatus. As a non-limiting example, the apparatus may comprise a memory and a processor communicatively coupled to one another. The memory may be configured to store an installer script configured to install multiple middleware scripts in an admin server, and one or more installed middleware instances. Each installed middleware instance may be an operation performed by the admin server. The processor may be configured to trigger initiation of the installer script, install the middleware scripts over a predefined time period, determine whether the one or more installed middleware instances comprises an installed middleware instance, and determine whether an operation performed by the admin server is associated with the installed middleware instance in response to determining that the one or more installed middleware instances comprises the installed middleware instance. Further, the processor may be configured to generate a first middleware flag indicating that the first installed middleware instance is active, and generate multiple start-up files comprising a first middleware instance corresponding to the first installed middleware instance.

Implement a Failsafe Middleware Starting Procedure Framework

In one or more embodiments, a system and a method are configured to implement a failsafe middleware starting procedure framework. In some embodiments, the system and the method are configured to determine whether an admin server and databases are running before a middle instance is performed. In particular, the system and the method enable failsafe operations that facilitate middleware starting procedures. In some embodiments, when an admin server starts, a middleware script is started along with a set of preconfigured start-up files. The middleware script may comprise evaluating whether the admin server configured to implement a middleware instance is online. Further, the middleware script comprises evaluating whether a database associated with the middleware instance is online and is configured to work with the admin server in the starting procedure. In other embodiments, the system and the method provide safety checks to wait until the admin server and the databases are online to implement the middleware instance.

In one or more embodiments, the system and the method described herein are integrated into a practical application of reducing, preventing, or eliminating negative impacts of failing middleware instances during implementation of a starting process. For example, the system and the method determine whether a server and databases are running to prevent or eliminate a possibility of failing to execute a middleware instance. In some embodiments, significant human resources, processing resources, and memory resources may be saved when processing resources and memory resources for a given middleware instance are ensured to be running before execution of the middleware is attempted. In some embodiments, the system and the method prevent the admin server from going into a hung state or from being unresponsive.

In one or more embodiments, the system and method are directed to improvements in computer systems. Specifically, the system and the method reduce processor and memory usage in user devices by preventing a possibility of failing to execute a middleware instance because processing resources from the admin server and/or memory resources from the databases are running before the middleware instance is executed.

In one or more embodiments, the system and the method may be performed by an apparatus, such as the server. Further, the system may comprise the apparatus. In addition, the system and the method may be performed as part of a process performed by the apparatus. As a non-limiting example, the apparatus may comprise a memory communicatively coupled to a processor. The memory may be configured to store a start script configured to enable execution of one or more middleware instances and multiple start-up files configured to indicate any middleware instances to be executed by an admin server or one or more managed servers. Each middleware instance may be executed using the admin server and multiple databases. The processor may be configured to trigger initiation of the start script, determine whether the start-up files comprise a middleware instance, ping the admin server in response to determining that the start-up files comprise the middleware instance, and determine that the admin server is running in response to receiving a server response. Further, the processor is configured to identify that the databases are associated with a managed server of the one or more managed servers, ping the managed server associated with the databases, determine that the databases are running in response to receiving a database response, and trigger a start of the middleware instance at the admin server or at the managed server.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 1 illustrates an example system in accordance with one or more embodiments;

DETAILED DESCRIPTION

Figure 2:
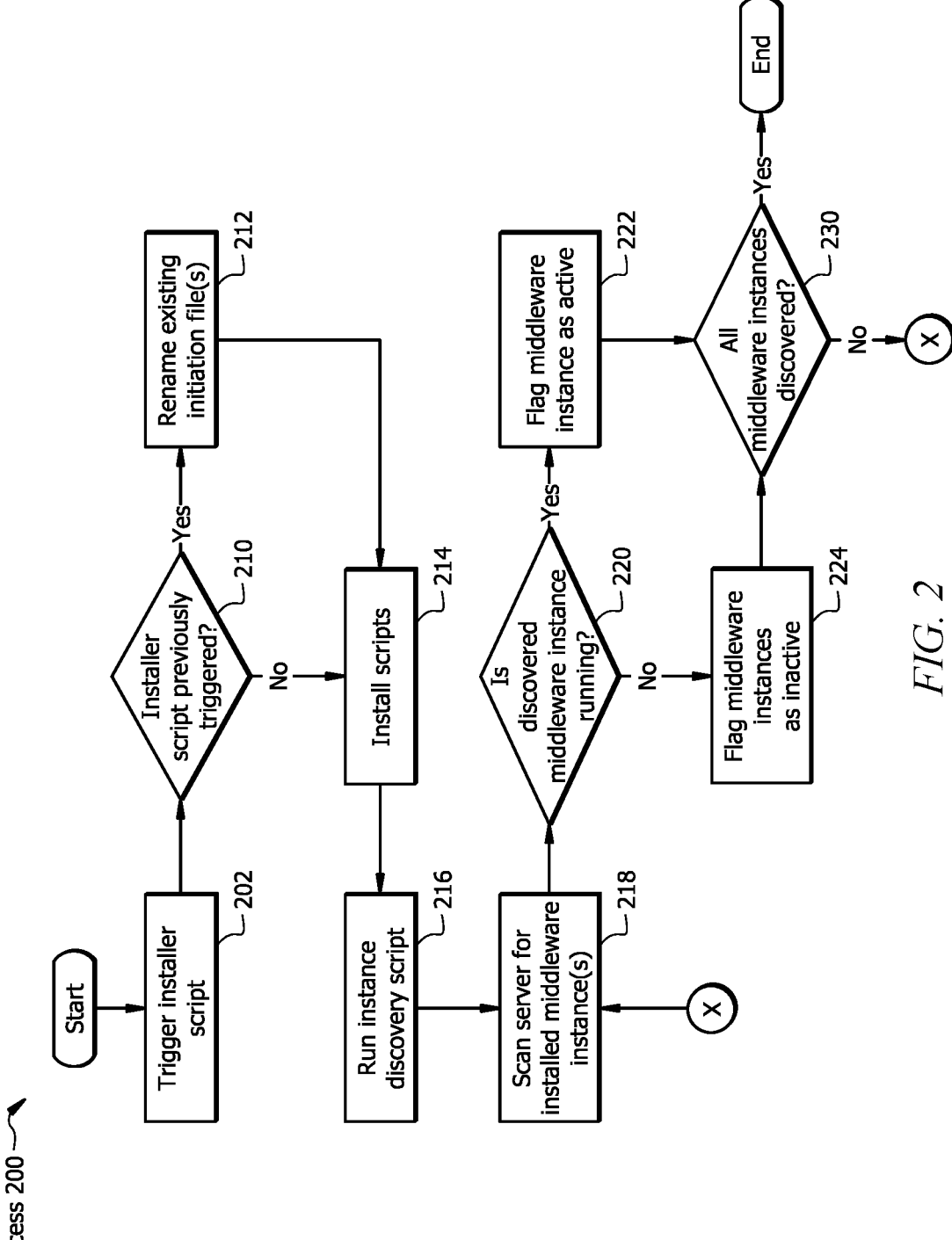
FIG. 2 illustrates first example operations performed by the system of FIG. 1 in accordance with one or more embodiments.
Figure 3A:
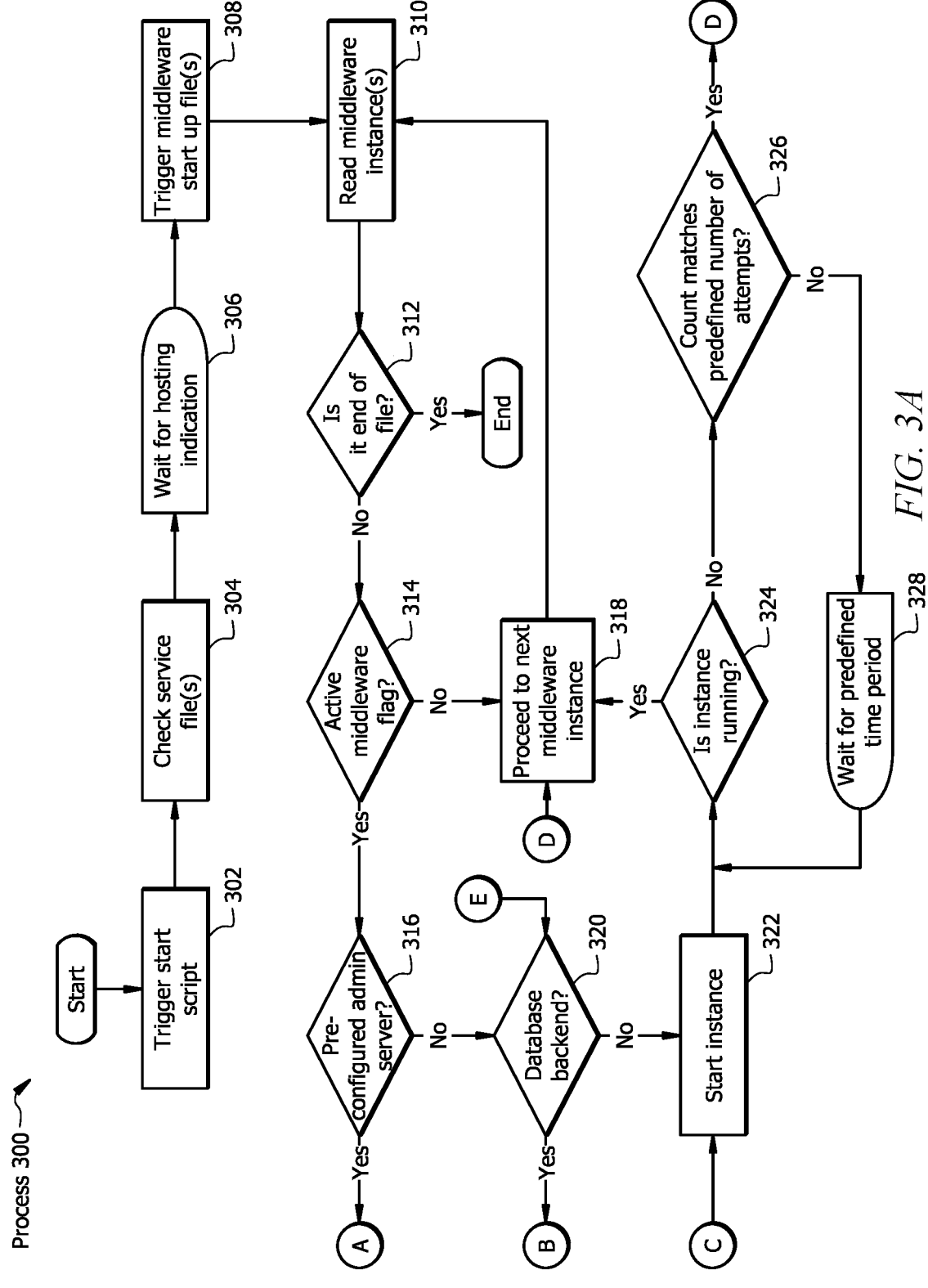
FIGS. 3A-3C illustrates second example operations performed by the system of FIG. 1 in accordance with one or more embodiments.
Figure 3B:
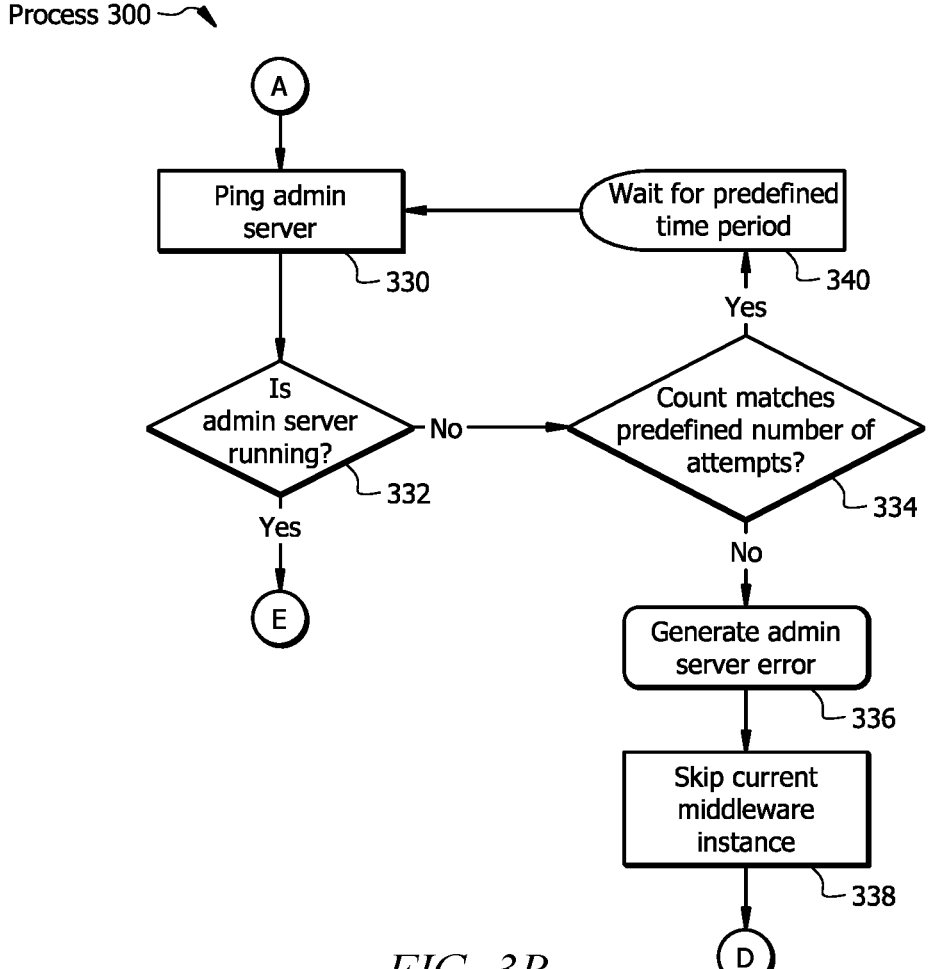
Figure 3C:
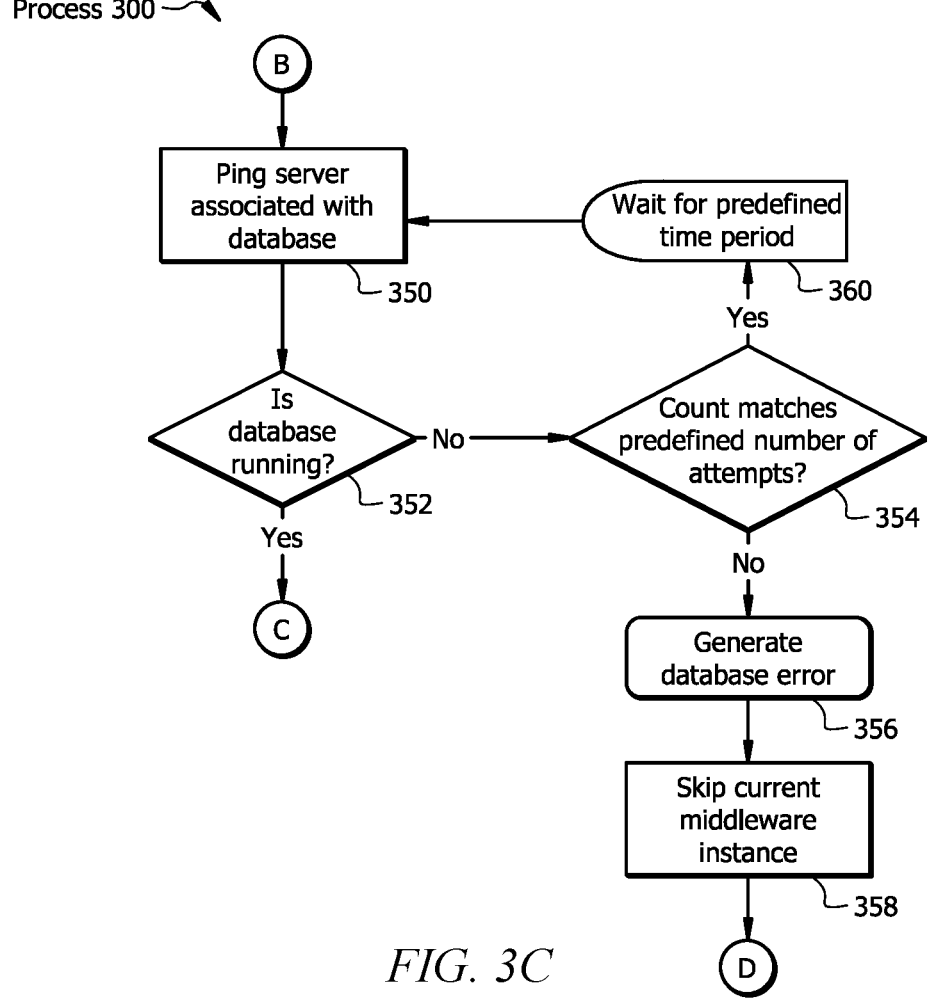

As described above, this disclosure provides various systems and methods to automate discovery of middleware instances during installation of a failsafe middleware starting procedure framework. Further, this disclosure provides various systems and methods to implement the failsafe middleware starting procedure framework. FIG. 1 illustrates a system 100 in which an administration (admin) server 102 installs and implements the failsafe middleware starting procedure framework. FIG. 2 illustrates a first process 200 performed by the system 100 of FIG. 1. FIGS. 3A-3C illustrate a second process 300 performed by the system 100 of FIG. 1.

System Overview

FIG. 1 illustrates a system 100 configured to automate discovery of middleware instances during installation of a failsafe middleware starting procedure framework. Further, the system 100 is configured to implement the failsafe middleware starting procedure framework. In the system 100 of FIG. 1, an admin server 102 is communicatively coupled to multiple managed servers 104A-104F (collectively, managed servers 104) and multiple user devices 106A-106C (collectively, user devices 106) via a network 108. The admin server 102 comprises multiple databases 110 configured to provide one or more memory resources to the admin server 102 and/or managed servers 104 and the user devices 106. In some embodiments, the managed server 104A may be a single managed server communicating with the admin server 102. In other embodiments, the managed server 104B, the managed server 104C, the managed server 104D, and the managed server 104E may be incorporated in a server cluster 112. The server cluster 112 may comprise less or more managed servers 104 than those shown in FIG. 1. In yet other embodiments, the user device 106A, the user device 106B, and the user device 106C may be incorporated in a user device group 114. Each of the user device 106A, the user device 106B, and the user device 106C may be operated by a user 116A, a user 116B, and a user 116C, respectively. The user device group 114 may comprise less or more user devices 106 than those shown in FIG. 1.

In one or more embodiments, the admin server 102 comprises the databases 110, an admin console 120, a user interface 122, a network interface 124, a processor 126 comprising a processing engine 128, and a memory 130. In some embodiments, the databases 110 may be standalone memory storage units or part of the memory 130. In some embodiments, the memory 130 may comprise instructions 132, one or more counters 134, multiple middleware instances 136, multiple server profiles 140 comprising one or more entitlements 142, one or more initiation files 150, one or more service files 152, one or more start-up files 154, one or more middleware flags 156 and one or more middleware scripts 160. In other embodiments, the middleware scripts 160 comprise an installer script 162, a discovery script 164, a start script 166, and an initiation script 168 among others. In some embodiments, the memory 130 is a non-transitory computer readable medium storing the instructions 132. The middleware scripts 160 may comprise mess or more scripts than those shown in FIG. 1. In turn, referring to the managed server 104A as a non-limiting example, the managed servers may comprise one or more server interfaces 170, one or more server peripherals 172, a server processor 174, one or more server databases 176, and a server memory 178. The server memory 178 may comprise multiple instructions 180, operation data 182, and one or more firewalls 184.

In other embodiments, the admin server 102 is configured to automate discovery of the middleware instances 136 during installation of the failsafe middleware starting procedure framework. In particular, the admin server 102 is configured to automatically discover installed middleware instances 136 as the middleware starting procedure framework is installed in the admin server 102. The admin server 102 is configured to generate operational parameters (e.g., a part of the instructions 132) to check for the installed middleware instances 136 currently configured in the admin server 102. In this regard, the admin server 102, prevents, or eliminates failures while enabling starting procedures for the middleware instances 136. In particular, the admin server 102 may trigger initiation of an installer script 162 a first time the admin server 102 is being programmed with the middleware starting procedure framework. The admin server 102 may identify whether any installed middleware instances 136 are associated with active middleware instances 136 in the admin server 102. Further, the admin server 102 may check for existing configuration of the admin server 102 and products currently associated with the admin server 102. The admin server 102 may generate multiple start-up files 154 based at least in part upon results evaluating whether the admin server 102 already comprises existing configuration to perform the middleware starting procedures and any middleware products associated to the middleware starting procedures in the system 100 (e.g., in the admin server 102 or one or more of the managed services 104).

In yet other embodiments, the admin server 102 or the admin console 120 removed from the admin server 102 is configured to implement the failsafe middleware starting procedure framework. In some embodiments, the admin server 102 or the admin console 120 is configured to determine whether the admin server 102 and the databases 110 are running before one of the middle instances 136 is performed. In particular, the admin server 102 enables failsafe operations that facilitate middleware starting procedures. In some embodiments, when the admin server 102 starts, one of the middleware scripts 160 (e.g., the start script 166) is started along with a set of preconfigured start-up files 154. The start script 166 may cause evaluating whether the admin server 102 or a corresponding managed server 104 configured to implement a given middleware instance 136 is online. Further, the start script 166 comprises evaluating whether a database (e.g., one of the databases 110 or a server database 176 in one of the managed servers 104) associated with the middleware instance 136 is online and is configured to work with the admin server 102 in the starting procedure.
System Components
Admin Servers The admin server 102 is generally any device or apparatus that is configured to process data and communicate with computing devices (e.g., the managed servers 104 and the user devices 106), additional databases, systems, and the like, via one or more interfaces (i.e., user interface 122 or network interface 124). The admin server 102 may comprise the processor 126 that is generally configured to oversee operations of the processing engine 128. The operations of the processing engine 128 are described further below in conjunction with the system 100 described in FIG. 1, the process 200 in FIG. 2, and the process 300 described in FIGS. 3A-3C.

The server 102 comprises the processor 126 communicatively coupled with the databases 110, the admin console 120, the user interface 122, the network interface 124, and the memory 130. The admin server 102 may be configured as shown, or in any other configuration.

The processor 126 comprises one or more processors communicatively coupled to the memory 130. The processor 126 may be any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). The processor 126 may be a programmable logic device, a microcontroller, a microprocessor, or any suitable combination of the preceding. The one or more processors 126 are configured to process data and may be implemented in hardware or software executed by hardware. For example, the processor 126 may be 8-bit, 16-bit, 32-bit, 64-bit or of any other suitable architecture. The processor 126 may include an arithmetic logic unit (ALU) for performing arithmetic and logic operations, processor registers that supply operands to the ALU and store the results of ALU operations, and a control unit that fetches the instructions 132 from the memory 130 and executes them by directing the coordinated operations of the ALU, registers and other components. In this regard, the one or more processors 126 are configured to execute various instructions. For example, the one or more processors 126 are configured to execute the instructions 132 to implement the functions disclosed herein, such as some or all of those described with respect to FIGS. 1-3C. In some embodiments, the functions described herein are implemented using logic units, FPGAs, ASICs, DSPs, or any other suitable hardware or electronic circuitry.

In one or more embodiments, the user interface 122 and the network interface 124 may be any suitable hardware and/or software to facilitate any suitable type of wireless and/or wired connection. These connections may include, but not be limited to, all or a portion of network connections coupled to the Internet, an Intranet, a private network, a public network, a peer-to-peer network, the public switched telephone network, a cellular network, a local area network (LAN), a metropolitan area network (MAN), a wide area network (WAN), and a satellite network. The user interface 122 and the network interface 124 may be configured to support any suitable type of communication protocol as would be appreciated by one of ordinary skill in the art.

In one or more embodiments, the user interface 122 and the network interface 124 may be configured to enable wired and/or wireless communications. The user interface 122 and the network interface 124 may be configured to communicate data between the admin server 102 and other user devices (i.e., the managed servers 104 or the user devices 106), network devices (i.e., routers in the network 108), systems, or domain(s) via the network 108. For example, the network interface 124 may comprise a WI-FI interface, a LAN interface, a WAN interface, a modem, a switch, or a router. The processor 126 may be configured to send and receive data using the user interface 122 and the network interface 124. The user interface 122 and the network interface 124 may be configured to use any suitable type of communication protocol.

In one or more embodiments, the databases 110 are configured to store data that enables the admin server 102 to configure, manage and coordinate one or more middleware systems. In some embodiments, the databases 110 store data used by the admin server 102 to act as a halfway point in between applications and other tools or databases.

In some embodiments, the admin console 120 may be a web browser-based or graphical user interface used to manage a middleware Server domain via the admin server 102. A middleware server domain may be a logically related group of middleware Server resources that managed as a unit. A middleware server domain may comprise the admin server 102 and one or more managed servers 104. The managed servers 104 may be standalone devises (e.g., the managed server 104A) and/or collected devices in a server cluster 112 (e.g., managed servers 104B-104E). The server cluster may be a group of managed servers that work together to provide scalability and higher availability for applications. In this regard, applications are developed and deployed as part of a domain. In other embodiments, one instance of the managed servers 104 in the middleware server domain may be configured as the admin server 102. The admin server 102 provides a central point for managing and configure the managed servers 104.

The memory 130 may be volatile or non-volatile and may comprise a read-only memory (ROM), random-access memory (RAM), ternary content-addressable memory (TCAM), dynamic random-access memory (DRAM), and static random-access memory (SRAM). The memory 130 may be implemented using one or more disks, tape drives, solid-state drives, and/or the like. The memory 130 is operable to store the instructions 132, the counters 134, the middleware instances 136, one or more server profiles 140 corresponding to one or more managed servers 104 and comprising one or more entitlements 142 for each server profile, the one or more initiation files 150, the one or more service files 152, the one or more start-up files 154, the one or more middleware flags 156, the one or more middleware scripts 160, and/or any other data or instructions. The instructions 132 may comprise any suitable set of instructions, logic, rules, or code operable to execute the processor 126.

In one or more embodiments, the server profiles 140 may comprise multiple profiles for the managed servers 104. Each server profile 140 may comprise one or more entitlements 142. As described above, the entitlements 142 may indicate that a given server is allowed to access one or more network resources in accordance with one or more rules and policies. The entitlements 142 may indicate that a given managed server 104 is allowed to perform one or more operations in the system 100 (e.g., provide a specific application access to one of the user devices 106). To secure or protect operations of the managed servers 104 from bad actors, the entitlements 142 may be assigned to a given server profile 140 in accordance with updated security information, which may provide guidance parameters to the use of the entitlements 142 based at least upon corresponding rules and policies.

In one or more embodiments, the initiation files 150, the service files 152, and the start-up files 154 are operational files comprising configuration parameters to perform one or more tasks at the admin server 102. The initiation files 150, the service files 152, and the start-up files 154 may be configured to enable multiple middleware operations in the system 100. In some embodiments, the initiation files 150, the service files 152, and the start-up files 154 enable the admin server 102 to perform operations as an application programing interface (API), an application server running enterprise applications, an application integration server, a content-centric middleware server, a data integration server, or a device middleware server. In some embodiments, the initiation files 150 provide triggers in the form of communication or control signals to start operations such as fetching the instructions 132 or running the middleware scripts 160. The service files 152 provide service information data indicating any services available in the admin server 102 and the managed servers 104. The service files 152 may provide lists, security information, and configuration parameters that the admin server 102 uses to set up a specific middleware instance 136. The start-up files 154 may be configuration data that provides starting procedure configuration to the admin server 102.

The counters 134 may maintain information associated with tracking time, an increasing counter, or a number of instances lapsed during pauses of operations in the admin server 102. In one or more embodiments, the middleware instances 136 comprise information concerning any use of the applications associated with the middleware operations associated with the admin server 102 or the managed servers 104. The middleware flags 156 may indicate an active state or an inactive state depending on whether a given middleware instance 136 is expected to run on the admin server 102. Each installed middleware instance 136 may be an operation performed by the admin server 102. Further, each middleware instance 136 may be executed using the admin server 102 and the databases 110.

In one or more embodiments, the middleware scripts 160 are optimized instructions that enable establishing of a specific procedure in the middleware server domain. In the example of FIG. 1, the middleware scripts 160 comprise the installer script 162 configured to install multiple middleware scripts 160 in the admin server 102, the discovery script 164 configured to scan the admin server 102 for installed middleware instances 136 that are previously running in the admin server 102, the start script 166 configured to indicate any middleware instances to be executed by the admin server 102 or one or more managed servers 104, and the initiation script 168 that provides ongoing configuration information to the service files 152 among others.

Managed Servers

In some embodiments, the managed servers 104 may be configured to perform one or more of the operations described in reference to the admin server 102. As described above, the managed servers 104 may comprise the server interfaces 170, the server peripherals 172, the server processor 174, the server databases 176, and the server memory 178. The managed servers 104 may be hardware configured to create, transmit, and/or receive information. The managed servers 104 may be configured to receive inputs from a user, process the inputs, and generate data information or command information in response. The data information may include documents or files generated using a graphical user interface (GUI). The command information may include input selections/commands triggered by a user using a peripheral component or one or more server peripherals 172 (i.e., a keyboard) or an integrated input system (i.e., a touchscreen displaying the GUI). The managed servers 104 may be communicatively coupled to the admin server 102 via a network connection (i.e., the server peripherals 172). The managed servers 104 may transmit and receive data information, command information, or a combination of both to and from the admin server 102 via the server interfaces 170. In one or more embodiments, the managed servers 104 are configured to exchange data, commands, and signaling with the admin server 102. In some embodiments, the managed servers 104 are configured to receive at least one firewall configuration from the admin server 102 to implement a firewall (one of the firewalls 184) at one of the managed servers 104.

In one or more embodiments, the server interfaces 170 may be any suitable hardware or software (e.g., executed by hardware) to facilitate any suitable type of communication in wireless or wired connections. These connections may comprise, but not be limited to, all or a portion of network connections coupled to additional managed servers 104, the user devices 106, the admin server 102, the Internet, an Intranet, a private network, a public network, a peer-to-peer network, the public switched telephone network, a cellular network, a LAN, a MAN, a WAN, and a satellite network. The server interfaces 170 may be configured to support any suitable type of communication protocol.

In one or more embodiments, the one or more server peripherals 172 may comprise audio devices (e.g., speaker, microphones, and the like), input devices (e.g., keyboard, mouse, and the like), or any suitable electronic component that may provide a modifying or triggering input to the managed server 104A. For example, the one or more server peripherals 172 may be speakers configured to release audio signals (e.g., voice signals or commands) during media playback operations. In another example, the one or more server peripherals 172 may be microphones configured to capture audio signals. In one or more embodiments, the one or more server peripherals 172 may be configured to operate continuously, at predetermined time periods or intervals, or on-demand.

The server processor 174 may comprise one or more processors communicatively coupled to and in signal communication with the server interface 170, the server peripherals 172, and the server memory 178. The server processor 174 is any electronic circuitry, including, but not limited to, state machines, one or more CPU chips, logic units, cores (e.g., a multi-core processor), FPGAs, ASICs, or DSPs. The server processor 174 may be a programmable logic device, a microcontroller, a microprocessor, or any suitable combination of the preceding. The one or more processors in the server processor 174 are configured to process data and may be implemented in hardware or software executed by hardware. For example, the server processor 174 may be an 8-bit, a 16-bit, a 32-bit, a 64-bit, or any other suitable architecture. The device processor 186 comprises an ALU to perform arithmetic and logic operations, processor registers that supply operands to the ALU, and store the results of ALU operations, and a control unit that fetches software instructions such as instructions 180 from the server memory 178 and executes the instructions 180 by directing the coordinated operations of the ALU, registers, and other components via a device processing engine (not shown). The server processor 174 may be configured to execute various instructions.

Network

The network 108 facilitates communication between and amongst the various devices of the system 100. The network 108 may be any suitable network operable to facilitate communication between the admin server 102, the one or more managed servers 104, and the user devices 106 of the system 100. The network 108 may include any interconnecting system capable of transmitting audio, video, signals, data, data packets (e.g., non-fungible tokens (NFT)), messages, or any combination of the preceding. The network 108 may include all or a portion of a public switched telephone network (PSTN), a public or private data network, a LAN, a MAN, a WAN, a local, regional, or global communication or computer network, such as the Internet, a wireline or wireless network, an enterprise intranet, or any other suitable communication link, including combinations thereof, operable to facilitate communication between the devices.

User Device

In one or more embodiments, each of the user devices 106 (e.g., the user devices 106A-106C) may be any computing device configured to communicate with other devices, such as the admin server 102, other user devices 106 in the user device group 114, databases, and the like in the system 100. Each of the user devices 106 may be configured to perform specific functions described herein and interact with one or more managed servers 104 and the user devices 106A-106C in the user device group 114. Examples of the user devices 106 comprise, but are not limited to, a laptop, a computer, a smartphone, a tablet, a smart device, an IoT device, a simulated reality device, an augmented reality device, or any other suitable type of device.

Operational Flow Overview

FIGS. 2-3C illustrates examples of one or more middleware operations implemented by the system 100 of FIG. 1, in accordance with one or more embodiments. While the one or more security operations are shown to be performed by the admin server 102, or the managed servers 104, additional electronic devices or components in the admin server 102 (e.g., the processor 126) may be configured to perform one or more of the operations in the process 200 and the process 300.

Automated Discovery of Middleware Instances During Installation of a Failsafe Middleware Starting Procedure Framework In the example of FIG. 2, the process 200 comprises middleware operations 202-230 in which the admin server 102 automates discovery of middleware instances during installation of the failsafe middleware starting procedure framework.

The process 200 starts at operation 202, where the admin server 102 triggers a start of the installer script 162 to initiate installation of the service files 152 and the start-up files 154 to be used in operation of middleware instances 136. For example, the admin server 102 may execute an init.d element in the installer script 162. At operation 210, the admin server 102 determines whether the installer script 162 was previously installed in the memory 130 by evaluating content of the databases 110 and the initiation files 150. The admin server 102 may determine whether the init.d element is already installed. If the admin server 102 determines that the installer script 162 was previously installed in the memory 130 (e.g., YES), the process 200 proceeds to operation 212. If the admin server 102 determines that the installer script 162 was not previously installed in the memory 130 (e.g., NO), the process 200 proceeds to operation 214. At operation 212, the admin server 102 renames existing initiation files 150 to align these files with the soon-to-be-installed middleware scripts 160. The init.d element is renamed in with a corresponding date and creates a new init.d element. Then, the process 200 proceeds to operation 214. At operation 214, the admin server 102 installs the middleware scripts 160 over a predefined time period in accordance with the installer script 162. The init.d element is installed as part of the middleware scripts 160.

At operation 216, the admin server 102 is configured to run at least one instance of the discovery script 164 to trigger a scan of the memory 130 to identify any middleware instances 136 associated with the admin server 102. At operation 218, the admin server 102 may be scanned to identify any installed middleware instances 136. Each of the installed middleware instances 136 is individually evaluated to determine whether specific middleware instance 136 are running in the admin server 102.

The process 200 continues to operation 220, where the admin server 102 is configured to determine whether specific middleware instance 136 is running in the admin server 102. If the specific middleware instance 136 is determined to be running in the admin server 102 (e.g., YES), the process 200 proceeds to operation 222. If the specific middleware instance 136 is determined to not be running in the admin server 102 (e.g., NO), the process 200 proceeds to operation 222. At operation 222, the admin server 102 flags the specific middleware instance 136 as active. For example, the installer script 162 updates a instances.txt element with a discovered instance and mark a corresponding middleware flag 156 as ACTIVE or YES. At operation 224, the admin server 102 flags the specific middleware instance 136 as inactive. The installer script 162 may update a instances.txt element with a discovered instance and mark a corresponding middleware flag 156 as INACTIVE or NO.

The process 200 continues at operation 230, where the admin server 102 is configured to determine whether middleware flags 156 have been assigned to all middleware instances 136 scanned in operation 218. If each of the discovered middleware instances 136 are assigned a corresponding middleware flag 156 (e.g., YES), the process 200 ends. If any of the discovered middleware instances 136 are not assigned a corresponding middleware flag 156 (e.g., NO), the process 200 returns to operation 218.

Implementation of a Failsafe Middleware Starting Procedure Framework

In the example FIGS. 3A-3C, the process 300 comprises middleware operations 302-358 in which the admin server 102 implements a failsafe middleware starting procedure framework during a reboot operation of the admin server 102.

The process 300 starts at operation 302 in FIG. 3A, where the admin server 102 triggers the start script 166 to implement the failsafe middleware starting procedure framework. At operation 304, the admin server 102 checks the service files 152 to identify any middleware instances 136 expected to be executed in the system 100. For example, the service file middleware.service element may be reviewed. At operation 306, the admin server 102 waits for a hosting indication that indicates whether the start script 166 may proceed with the framework. For example, the process 300 is paused for a set time to ensure that a hosting user (e.g., one of the user devices 106) is operational. At operation 308, the admin server 102 triggers the middleware start-up files 154 to initiate the starting procedures. For example, the middleware.sh element is executed as a start-up file. At operation 310, the admin server 102 reads from the service files 152 one or more middleware instances 136. For example, the middleware.sh element reads the instance.txt element.

The process 300 continues at operation 312, where the admin server 102 determines whether the end of the service files 152 have been reached. The admin server 102 identify whether there are additional middleware instances 136 to be executed. If the admin server 102 determines that the end of the service files 152 is reached (e.g., YES), the process 300 ends. If the admin server 102 determines that the end of the service files 152 is not reached (e.g., NO), the process 300 continues to operation 314. At operation 314, the admin server 102 determines whether the middleware instances 136 are associated to any active middleware flags 156. The admin server 102 may confirm the whether the admin server 102 is available (e.g., running) to execute the middleware instance 136 and whether the databases 110 are available to support the memory resources associated with a specific middleware instance 136. If the specific middleware instance 136 has a corresponding active middleware flag 156 (e.g., YES), the process 300 continues to operation 316. If the specific middleware instance 136 does not have a corresponding active middleware flag 156 (e.g., NO), the process 300 continues to operation 318. At operation 318, the admin server 102 selects a next middleware instance 136 from the service files 152. The next entry in the instance.txt element is read.

At operation 316, the admin server 102 determines whether the admin server 102 is previously configured (e.g., preconfigured). For example, the admin server 102 may be determined to comprise a pre-configuration associated with a WebLogic Server (WLS) product or a WebSphere Application Server (WAS) product. If the admin server 102 is previously preconfigured (e.g., YES), the process 300 continues to operation 330 in FIG. 3B. If the admin server 102 is not previously preconfigured (e.g., NO), the process 300 continues to operation 320.

At operation 320, the admin server 102 determines whether the databases 110 comprise a backend. If the databases 110 comprise the backend (e.g., YES), the process 300 continues to operation 350 in FIG. 3C. If the databases 110 do not comprise the backend (e.g., NO), the process 300 continues to operation 322.

At operation 322, the admin server 102 starts the specific middleware instance 136. At operation 324, the admin server 102 determines whether the middleware instance 136 was successfully executed (e.g., is running or started). If the middleware instance 136 is running (e.g., YES), the process 300 returns to operation 318. If the middleware instance 136 is not running (e.g., NO), the process 300 continues to operation 326.

At operation 326, the admin server 102 counts each attempt to get the middleware instance 136 started and determines whether the counter 134 matches a predefined number of attempts. For example, a loop count may be determined to match a total number of retries. If the counter 134 matches the predefined number of attempts (e.g., NO), the process 300 returns to operation 318. If the counter 134 does not match the predefined number of attempts (e.g., YES), the process 300 continues to operation 328. At operation 328, the admin server 102 waits for a predefined time period (e.g., a time duration in seconds, minutes, or the like). Once the predefined time period is completed, the process 300 continues to operation 324.

In FIG. 3B, the process 300 continues at operation 330 where the admin server 102 is pinged for availability to perform the specific middleware instance 136. At operation 332, the admin server 102 determines whether the admin server 102 is running to allow the middleware instance 136. If the admin server 102 is running (e.g., YES), the process 300 returns to operation 320 in FIG. 3A. If the admin server 102 is not running (e.g., NO), the process 300 continues to operation 334.

At operation 334, the admin server 102 counts each attempt to check whether the admin server 102 is running and determines whether the counter 134 matches a predefined number of attempts. For example, a loop count may be determined to match a total number of retries. If the counter 134 matches the predefined number of attempts (e.g., NO), the process 300 continues to operation 340. At operation 340, the admin server 102 waits for a predefined time period (e.g., a time duration in seconds, minutes, or the like). Once the predefined time period is completed, the process 300 returns to operation 330. If the counter 134 does not match the predefined number of attempts (e.g., YES), the process 300 continues to operation 336. At operation 336, the admin server 102 generates an admin server error indicating that the admin server 102 is not available to execute the specific middleware instance 136. At operation 338, the admin server 102 skips execution of the current middleware instance 136 and the process 300 returns to operation 318.

In FIG. 3C, the process 300 continues at operation 350 where the databases 110 are pinged for availability to provide memory resources for the specific middleware instance 136. At operation 352, the admin server 102 determines whether the databases 110 are running to allow the middleware instance 136. If the databases 110 are running (e.g., YES), the process 300 returns to operation 322 in FIG. 3A. If the databases 110 are not running (e.g., NO), the process 300 continues to operation 354.

At operation 354, the admin server 102 counts each attempt to check whether the databases 110 are running and determines whether the counter 134 matches a predefined number of attempts. For example, a loop count may be determined to match a total number of retries. If the counter 134 matches the predefined number of attempts (e.g., NO), the process 300 continues to operation 360. At operation 360, the admin server 102 waits for a predefined time period (e.g., a time duration in seconds, minutes, or the like). Once the predefined time period is completed, the process 300 returns to operation 350. If the counter 134 does not match the predefined number of attempts (e.g., YES), the process 300 continues to operation 356. At operation 356, the admin server 102 generates a database error indicating that the databases 110 are not available to provide the memory resources for the specific middleware instance 136. At operation 358, the admin server 102 skips execution of the current middleware instance 136 and the process 300 returns to operation 318.

In one or more embodiments, the databases 110 may be one of the server databases 176 in one of the managed servers 104. In one example, the admin server 102 may determine that it is running to perform the middleware instance 136 upon receiving a server response indicating that the admin server 102 is available to perform the middleware instances 136. In one or more embodiments, the admin server 102 may determine whether the processor 126 is available (e.g., running) to perform the specific middleware instance 136. In another example, the admin server 102 may determine that a specific managed server 104 is running to perform the middleware instance 136 upon receiving a server response indicating that the corresponding managed server 104 is available to perform the middleware instances 136. In one or more embodiments, the admin server 102 may determine whether the server processor 174 is available (e.g., running) to perform the specific middleware instance 136. In yet another example, the admin server 102 may determine that the databases 110 are running to provide memory resources to execute the middleware instance 136 upon receiving a database response indicating that the databases 110 are available to provide memory resources to execute the middleware instances 136. In one or more embodiments, the admin server 102 may determine whether the databases 110 are available (e.g., running) and may provide the database response. In one or more embodiments, one of the managed servers 104 may determine whether the corresponding server databases 176 are available (e.g., running) and may provide the database response.

Scope of the Disclosure

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112 (f) as it exists on the date of filing hereof unless the words "means for" or "step for" are explicitly used in the particular claim.

The invention claimed is:

1. An apparatus, comprising:
   a memory, configured to store:
      a start script configured to enable execution of one or more middleware instances, each middleware instance being executed using an admin server and a plurality of databases; and
      a plurality of start-up files configured to indicate any middleware instances to be executed by the admin server or one or more managed servers; and
   a processor communicatively coupled to the memory and configured to:
      trigger initiation of the start script;
      determine whether the plurality of start-up files comprise a first middleware instance;
      in response to determining that the plurality of start-up files comprise the first middleware instance, ping the admin server;

in response to receiving a first server response, determine that the admin server is running;

identify that the plurality of databases are associated with a managed server of the one or more managed servers;

ping the managed server associated with the plurality of databases;

in response to receiving a first database response, determine that the plurality of databases are running; and trigger a start of the first middleware instance at the admin server or at the managed server.

2. The apparatus of claim 1, wherein the processor is further configured to:

determine whether the first middleware instance is running;

in response to determining that the first middleware instance is running, determine whether the plurality of start-up files comprise a second middleware instance; and in response to determining that the first middleware instance is not running, pause operations at the apparatus for a predefined time period.

3. The apparatus of claim 2, wherein the processor is further configured to:

in response to determining that the plurality of start-up files comprise the second middleware instance, ping the admin server;

in response to receiving a second server response, determine that the admin server is running;

ping the managed server associated with the plurality of databases;

in response to receiving a second database response, determine that the plurality of databases are running; and trigger a start of the second middleware instance at the admin server or at the managed server.

4. The apparatus of claim 2, wherein the processor is further configured to:

in response to determining that the plurality of start-up files do not comprise the second middleware instance, trigger completion of the start script.

5. The apparatus of claim 1, wherein:

the start script is triggered by a boot-up operation of the apparatus.

6. The apparatus of claim 1, wherein the processor is further configured to:

in response to not receiving the first server response, determine that the admin server is not running;

in response to determining that the admin server is not running, pause operations at the apparatus for a predefined time period; and upon completion of the predefined time period, ping the admin server once again.

7. The apparatus of claim 1, wherein the processor is further configured to:

in response to not receiving the first server response, determine that the plurality of databases are not running;

in response to determining that the plurality of databases are not running, pause operations at the apparatus for a predefined time period; and upon completion of the predefined time period, ping the managed server associated with the plurality of databases once again.

8. A method, comprising:

triggering initiation of a start script configured to enable execution of one or more middleware instances, each middleware instance being executed using an admin server and a plurality of databases;

determining whether a plurality of start-up files comprise a first middleware instance;

in response to determining that a plurality of start-up files comprise the first middleware instance, pinging the admin server, wherein the plurality of start-up files are configured to indicate any middleware instances to be executed by the admin server or one or more managed servers;

in response to receiving a first server response, determining that the admin server is running;

identifying that the plurality of databases are associated with a managed server of the one or more managed servers;

pinging the managed server associated with the plurality of databases;

in response to receiving a database response, determining that the plurality of databases are running; and triggering a start of the first middleware instance at the admin server or at the managed server.

9. The method of claim 8, further comprising:

determining whether the first middleware instance is running;

in response to determining that the first middleware instance is running, determining whether the plurality of start-up files comprise a second middleware instance; and in response to determining that the first middleware instance is not running, pausing operations for a predefined time period.

10. The method of claim 9, further comprising:

in response to determining that the plurality of start-up files comprise the second middleware instance, pinging the admin server;

in response to receiving a second server response, determining that the admin server is running;

pinging the managed server associated with the plurality of databases;

in response to receiving a second database response, determining that the plurality of databases are running; and triggering a start of the second middleware instance at the admin server or at the managed server.

11. The method of claim 9, further comprising:

in response to determining that the plurality of start-up files do not comprise the second middleware instance, triggering completion of the start script.

12. The method of claim 8, wherein:

the start script is triggered by a boot-up operation.

13. The method of claim 8, further comprising:

in response to not receiving the first server response, determining that the admin server is not running;

in response to determining that the admin server is not running, pausing operations for a predefined time period; and upon completion of the predefined time period, pinging the admin server once again.

14. The method of claim 8, wherein:

in response to not receiving the first server response, determining that the plurality of databases are not running;

in response to determining that the plurality of databases are not running, pausing operations for a predefined time period; and upon completion of the predefined time period, pinging the managed server associated with the plurality of databases once again.

15. A non-transitory computer readable medium storing instructions that when executed by a processor cause the processor to:

trigger initiation of a start script configured to enable execution of one or more middleware instances, each middleware instance being executed using an admin server and a plurality of databases;

determine whether a plurality of start-up files comprise a first middleware instance;

in response to determining that a plurality of start-up files comprise the first middleware instance, ping the admin server, wherein the plurality of start-up files are configured to indicate any middleware instances to be executed by the admin server or one or more managed servers;

in response to receiving a first server response, determine that the admin server is running;

identify that the plurality of databases are associated with a managed server of the one or more managed servers;

ping the managed server associated with the plurality of databases;

in response to receiving a first database response, determine that the plurality of databases are running; and trigger a start of the first middleware instance at the admin server or at the managed server.

16. The non-transitory computer readable medium of claim 15, wherein the processor is further caused to:

determine whether the first middleware instance is running;

in response to determining that the first middleware instance is running, determine whether the plurality of start-up files comprise a second middleware instance; and in response to determining that the first middleware instance is not running, pause operations at the apparatus for a predefined time period.

17. The non-transitory computer readable medium of claim 16, wherein the processor is further caused to:

in response to determining that the plurality of start-up files comprise the second middleware instance, ping the admin server;

in response to receiving a second server response, determine that the admin server is running;

ping the managed server associated with the plurality of databases;

in response to receiving a second database response, determine that the plurality of databases are running; and trigger a start of the second middleware instance at the admin server or at the managed server.

18. The non-transitory computer readable medium of claim 16, wherein the processor is further caused to:

in response to determining that the plurality of start-up files do not comprise the second middleware instance, trigger completion of the start script.

19. The non-transitory computer readable medium of claim 15, wherein the processor is further caused to:

in response to not receiving the first server response, determine that the admin server is not running;

in response to determining that the admin server is not running, pause operations at the apparatus for a predefined time period; and upon completion of the predefined time period, ping the admin server once again.

20. The non-transitory computer readable medium of claim 15, wherein the processor is further caused to:

in response to not receiving the first server response, determine that the plurality of databases are not running;

in response to determining that the plurality of databases are not running, pause operations at the apparatus for a predefined time period; and upon completion of the predefined time period, ping the managed server associated with the plurality of databases once again.

* * * * *